United States Patent
Baker et al.

(10) Patent No.: US 10,401,690 B2
(45) Date of Patent: Sep. 3, 2019

(54) METHOD FOR PRODUCING A FLEXIBLE ELECTRO-OPTIC CELL

(71) Applicant: ALPHAMICRON INCORPORATED, Kent, OH (US)

(72) Inventors: Christine Baker, Cuyahoga Falls, OH (US); Roy E. Miller, Stow, OH (US); Ludmila Sukhomlinova, Kent, OH (US); Eui-Yeul Park, Hudson, OH (US); William Ryan, Kent, OH (US); Bahman Taheri, Shaker Heights, OH (US)

(73) Assignee: ALPHAMICRON INCORPORATED, Kent, OH (US)

(*) Notice: Subject to any disclaimer, the term of this patent is extended or adjusted under 35 U.S.C. 154(b) by 0 days.

(21) Appl. No.: 15/526,023

(22) PCT Filed: Nov. 3, 2015

(86) PCT No.: PCT/US2015/058737
§ 371 (c)(1),
(2) Date: May 17, 2017

(87) PCT Pub. No.: WO2016/081185
PCT Pub. Date: May 26, 2016

(65) Prior Publication Data
US 2017/0329161 A1 Nov. 16, 2017

Related U.S. Application Data

(60) Provisional application No. 62/080,630, filed on Nov. 17, 2014.

(51) Int. Cl.
*G02F 1/1339* (2006.01)
*G02F 1/1341* (2006.01)
(Continued)

(52) U.S. Cl.
CPC .......... *G02F 1/1341* (2013.01); *G02F 1/1303* (2013.01); *G02F 1/1337* (2013.01);
(Continued)

(58) Field of Classification Search
CPC ............. G02F 1/1341; G02F 1/133351; G02F 1/13392; G02F 1/1337; G02F 1/13394;
(Continued)

(56) References Cited

U.S. PATENT DOCUMENTS

| 4,435,047 A | 3/1984 | Fergason et al. ............. 350/334 |
| 4,647,157 A * | 3/1987 | Chiklis .................. G02F 1/1339 349/103 |

(Continued)

FOREIGN PATENT DOCUMENTS

| EP | 1 072 931 A2 | 1/2001 | ........... G02F 1/1339 |
| WO | WO 02/01284 A1 | 1/2002 | ........... G02F 1/1333 |
| WO | WO 0201284 A1 * | 1/2002 | ......... G02F 1/13336 |

OTHER PUBLICATIONS

International Search Report dated Feb. 4, 2016 in related application No. PCT/US2015/058737.

(Continued)

*Primary Examiner* — Donald L Raleigh
(74) *Attorney, Agent, or Firm* — Renner Kenner Greive Bobak Taylor & Weber

(57) ABSTRACT

Provided is a method of producing a flexible cell unit enclosed by a border seal and filled with an electro-optic material. The flexible cell includes a first and a second substrate separated by a controlled distance maintained by spacers. The method includes providing two continuous sheets of flexible plastic material to form the first and second substrates and depositing an electro-optic material on at least one substrate. The electro-optic material is non-encapsulated, non-polymeric, and contains less than 1% polymer- (Continued)

izable material. The method also includes pairing the first and second substrates while roll-filling the flexible cell with the electro-optic material using one or more lamination rollers so that the electro-optic material completely fills the controlled distance between the first and second substrates.

56 Claims, 8 Drawing Sheets

(51) Int. Cl.
    *G02F 1/1333*     (2006.01)
    *G02F 1/13*     (2006.01)
    *G02F 1/1337*     (2006.01)

(52) U.S. Cl.
    CPC ........ *G02F 1/1339* (2013.01); *G02F 1/13392* (2013.01); *G02F 1/13394* (2013.01); *G02F 1/133305* (2013.01); *G02F 1/133351* (2013.01); *G02F 1/133377* (2013.01); *G02F 2001/13398* (2013.01); *G02F 2001/133354* (2013.01)

(58) Field of Classification Search
    CPC ................. G02F 1/1339; G02F 1/1303; G02F 1/133305; G02F 2001/13398; G02F 2001/133354
    See application file for complete search history.

(56) References Cited

U.S. PATENT DOCUMENTS

| | | | | |
|---|---|---|---|---|
| 4,904,056 | A * | 2/1990 | Castleberry | G02F 1/133512 349/110 |
| 5,683,838 | A | 11/1997 | Iijima et al. | 430/20 |
| 5,868,892 | A | 2/1999 | Klima, Jr. | 156/267 |
| 5,943,113 | A | 8/1999 | Ichihashi et al. | 349/187 |
| 6,222,603 | B1 * | 4/2001 | Sakai | G02F 1/1339 349/153 |
| 6,459,467 | B1 | 10/2002 | Hashimoto et al. | 349/153 |
| 6,618,113 | B1 * | 9/2003 | Ulrich | G02F 1/133377 349/156 |
| 6,784,953 | B2 | 8/2004 | Liang et al. | 349/86 |
| 7,081,180 | B2 | 7/2006 | Chen et al. | 156/269 |
| 7,351,506 | B2 | 4/2008 | Schneider et al. | 430/20 |
| 7,649,674 | B2 | 1/2010 | Danner et al. | 359/296 |
| 7,850,867 | B2 | 12/2010 | Liang et al. | 252/299.01 |
| 8,277,587 | B2 | 10/2012 | Kimura et al. | 156/64 |
| 8,715,445 | B2 | 5/2014 | Sugimoto et al. | 156/257 |
| 2002/0124950 | A1 | 9/2002 | Klima, Jr. | 156/256 |
| 2005/0211699 | A1 * | 9/2005 | Faris | G02F 1/133305 219/522 |
| 2006/0256277 | A1 * | 11/2006 | Rudin | B32B 7/12 349/187 |
| 2007/0026570 | A1 | 2/2007 | Daniels et al. | 438/108 |
| 2008/0013033 | A1 * | 1/2008 | Kim | G02F 1/13392 349/155 |
| 2009/0128771 | A1 | 5/2009 | Yang et al. | 349/189 |
| 2009/0147206 | A1 | 6/2009 | Lee et al. | 349/154 |
| 2011/0205482 | A1 * | 8/2011 | Goetz | C09K 19/3402 349/183 |
| 2013/0165010 | A1 | 6/2013 | Wang et al. | 445/25 |
| 2014/0320777 | A1 * | 10/2014 | Fukushima | G02F 1/133305 349/43 |
| 2016/0011445 | A1 * | 1/2016 | Chen | G02F 1/1337 349/110 |

OTHER PUBLICATIONS

Written Opinion dated Feb. 4, 2016 in related application No. PCT/US2015/058737.

Wu et al.; *P-55: Cell Filling of Flexible Liquid Crystal Displays Using One Line Filling and Tilted Roller Pressing*; SID 07 Digest; pp. 393-396; 2007.

Schneider et al.; *New Developments in Flexible Cholesteric Liquid Crystal Displays*; Emerging Liquid Crystal Technologies II; Proc. of SPIE; vol. 6487, pp. 64870J-1-64870J-5; 2007.

Schneider et al.; *Flexible Encapsulated Cholesteric LCDs by Polymerization Induced Phase Separation*; SID Int. Symp. Digest Tech. Papers; vol. 36; pp. 1568-1571; 2005.

* cited by examiner

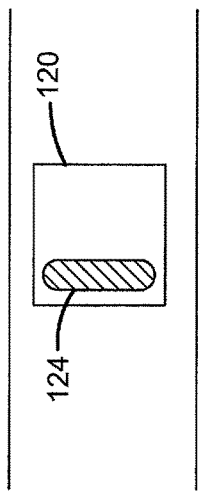
FIG. 3A
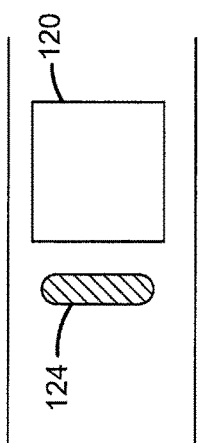
FIG. 3B
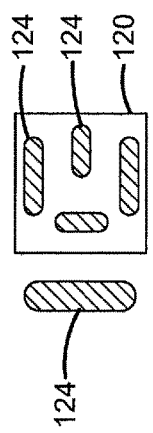
FIG. 3C
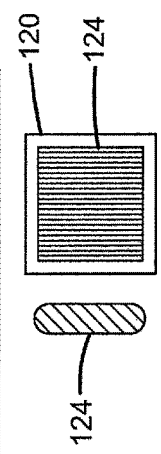
FIG. 3D
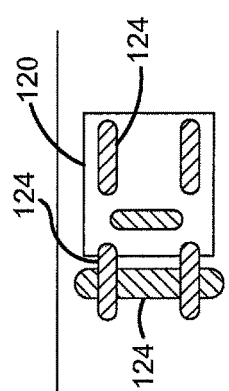
FIG. 3E
FIG. 3F

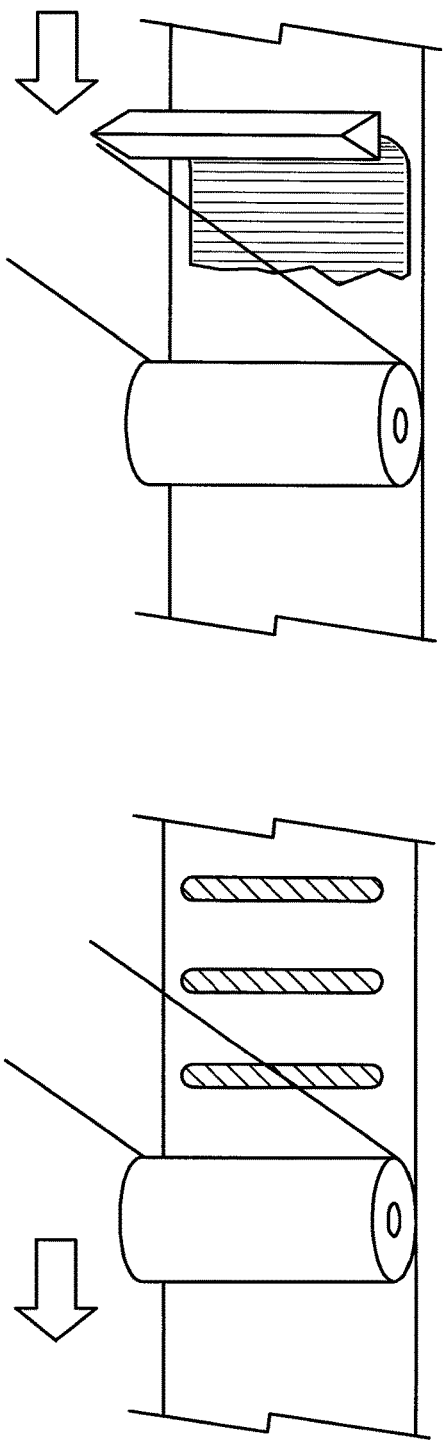
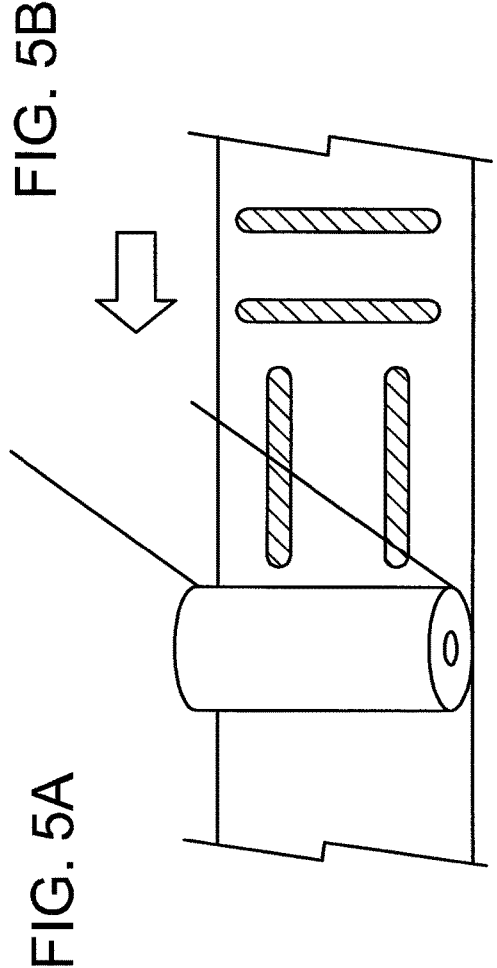
FIG. 5B
FIG. 5C
FIG. 5A

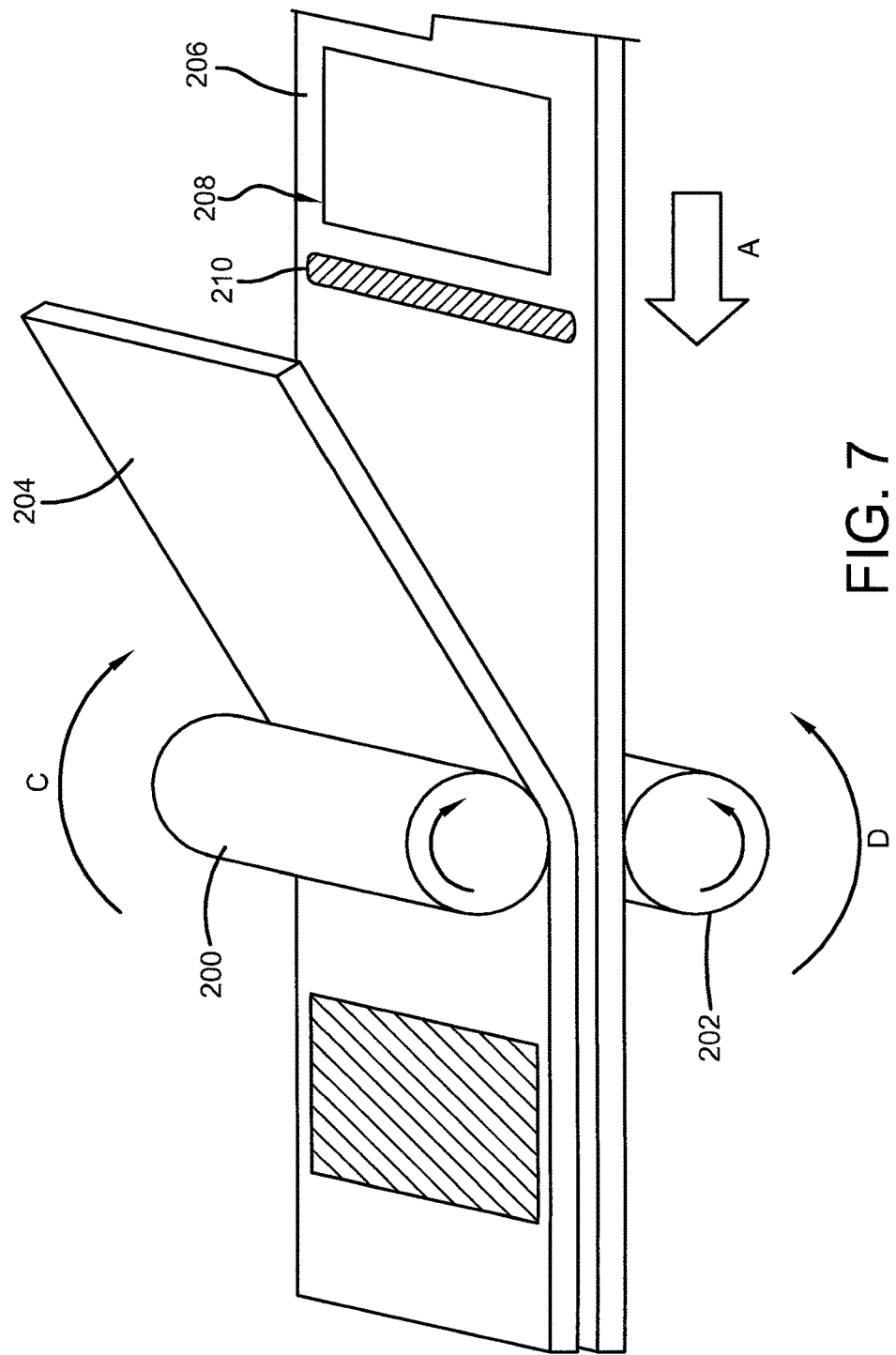

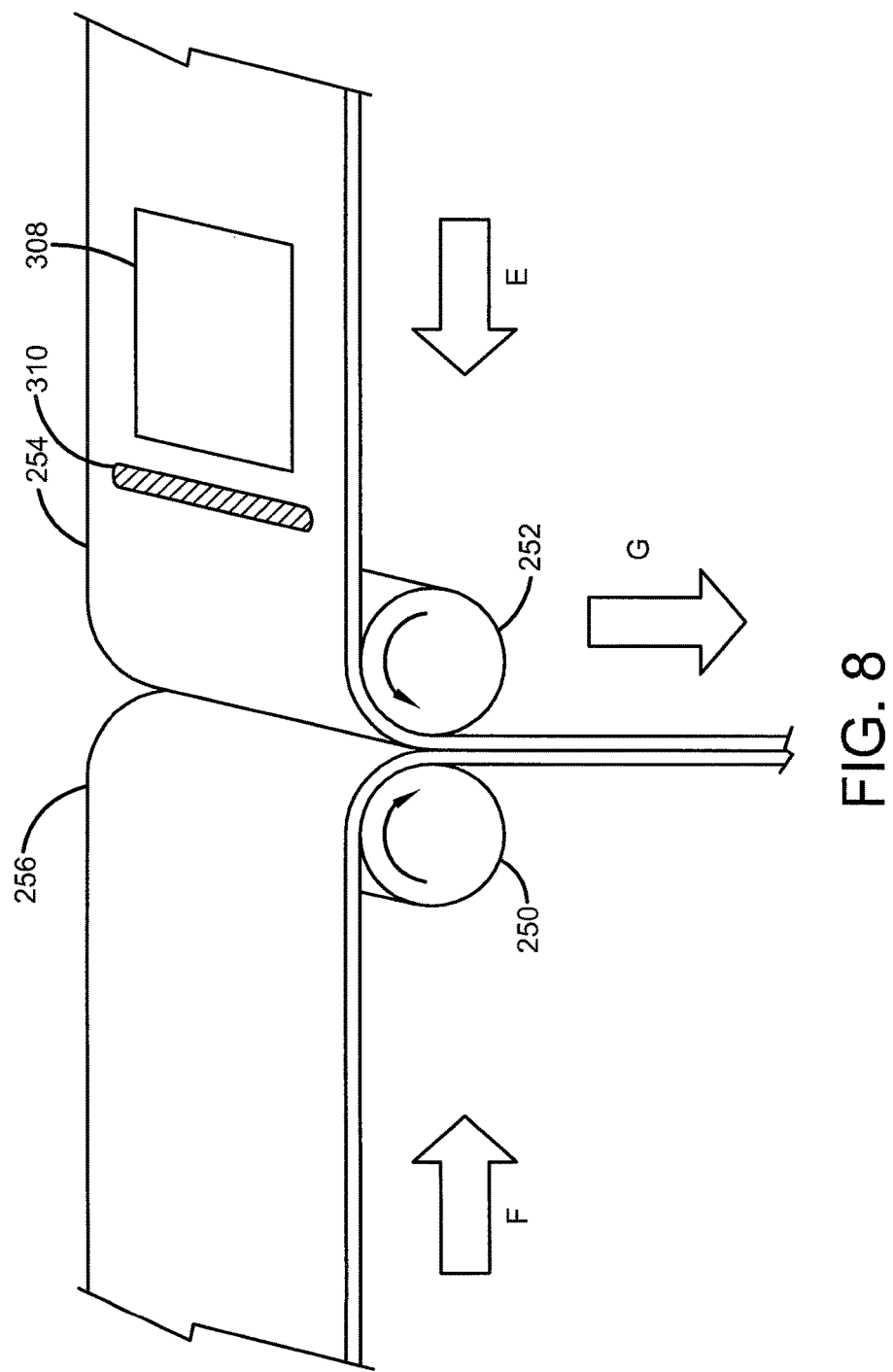

METHOD FOR PRODUCING A FLEXIBLE ELECTRO-OPTIC CELL

BACKGROUND

Most liquid crystal (LC) devices are made from a sandwich of liquid crystal between two spaced glass substrates coated with a transparent conductor. The glass substrates are generally held together to a predetermined gap using an epoxy-based gasket (edge seal) at the edge and are referred to as a panel. The liquid crystal is injected into the gap of the panel using either a vacuum filling process or one drop filling process. In the case of vacuum filling process, the gasket around the panel is not continuous and has an opening referred to as "fill hole". The panel is then placed in a vacuum chamber to vacate the air from within the panel. After this step, and while still under vacuum, liquid crystal is introduced to the fill hole. The liquid crystal then fills the gap inside the panel due to capillary forces. This may be accelerated by bringing the panel to atmospheric pressure after the liquid crystal introduction to the fill hole. The process is completed once the liquid crystal has filled the panel gap. However, to avoid future problems (e.g. shrinkage, formation of bubbles, etc.) the amount of liquid crystal in the panel is more than the anticipated volume. As such, the panels are then pressed to remove the excess liquid crystal by a process referred to as "cold pressing". The fill hole is then sealed using a secondary epoxy to avoid air from entering the panel.

This process is difficult to execute in large area panels because the filling time is proportional to the panel area, so the waiting time needed for the filling to complete may take several hours for each panel. This process is uneconomical, especially with the additional time required to vacate the air in the vacuum process. Furthermore, the control of cell gap becomes exceeding difficult.

The use of flexible substrates in the traditional vacuum process poses another difficulty. When air in the chamber is vacated any trapped air in the empty cell causes the empty cell to expand, much like a balloon. This could lead to damage of the cell or breaking of the cell gasket. Extra precautions are needed, such as sandwiching the flexible cell between two ridged materials to prevent ballooning, for the vacuum fill process.

To mitigate this, a new process, referred to as one drop filling (ODF) was invented. In this process, the glass substrate is coated. A gasket is deposited around the entire perimeter of the glass substrate. The substrate is then placed in a large vacuum chamber. A second glass substrate is also placed in the vacuum chamber and is held above the original substrate. At this point, a dispenser deposits the exact amount of liquid crystal that will be needed on the bottom glass substrate. Once vacuum state is achieved, the two substrates are brought together. The epoxy gasket is cured creating a sealed system. The liquid crystal fills this panel through capillary forces. The panel can be brought to atmospheric pressure to accelerate the filling process as before. The advantage of the ODF method is that the cold press step is omitted. Furthermore, the system can reduce the process time, especially for large area panels.

An important aspect of these processing methods is that the final panel is considered to be under negative pressure. In other words, since the panel is fabricated under vacuum, the inside pressure is considered to be lower than the atmospheric pressure. This means that air will penetrate the panel if given the opportunity. Therefore a breach in the gasket will result in catastrophic failure of the panel. To avoid this problem, the gaskets are designed to be impenetrable to air.

Glass based panels cannot be used in applications in which durability, flexibility, or light-weight is of importance. Such applications include eyewear, protective shields, highly curved windows/displays, etc. Therefore, there is a demand for flexible plastic LC devices.

The manufacturing methods used for liquid crystal panel fabrication are not fully compatible with plastic substrates. For one thing, plastic is flexible, making the handling of plastic substrates particularly difficult in fabrication processes. The lack of flexibility of glass which is considered a drawback for many applications is in fact necessary for the fabrication processes stated above. While some small area plastic cells have been made using conventional processes above, the low yields have limited their introduction. This is primarily due to the stringent conditions needed for any vacuum filling process. Furthermore, once the panel is fabricated, the plastic based devices have a significantly lower lifetime. This is due to the fact that plastics are permeable materials, allowing transfer of gasses. Since the panels are fabricated under negative pressure, air will eventually enter the cell. This has significantly limited introduction of plastic based liquid crystal devices. While many companies (e.g. Teijin, DuPont, Mitsubishi etc.) have been working on hard coats to reduce the gas permeability of plastic substrates, they have not yet reached the values offered by even the thinnest glass.

Some liquid crystal devices based on plastic have emerged in the market. They attempt to overcome these issues by processing the system in atmospheric pressure. A method of achieving this is to eliminate the gasket seal and use a roller to place the liquid crystal on the substrates. However, to avoid the liquid crystal from coming out of the panel because of lack of gasket seal, they introduce a significant amount of polymer in the liquid crystal. In this method, the liquid crystal material is "encapsulated," meaning a quantity of liquid crystal material is confined or contained in an encapsulating medium. Such microencapsulation prevents the liquid crystal from "flowing," making manufacture of large displays possible. The polymer encapsulated liquid crystal creates micro "panels" within the large panel. The polymer also helps maintain the cell gap by adhering to the two substrates. These materials most commonly known as Polymer Dispersed Liquid Crystal (PDLC), Nematic Curvilinear Aligned Phase (N-CAP), Polymer Stabilized Cholesteric Texture (PSCT), Polymer Encapsulated Liquid Crystal (PELC), and Polymer Network Liquid Crystal (PNLC), etc. have a significant drawback in that they do not exhibit optical clarity and are hazy due to light scattering by the encapsulated liquid crystal domains. This has limited their use to privacy applications (e.g. privacy windows, etc.). It should be noted that these systems lack the stability of the glass panels because of absence of the gasket. In particular, air and moisture penetrates the panel over time and renders the product inoperable. As such, these systems have not achieved marketability. To overcome this limitation, the encapsulation size by the polymer was increased. Furthermore, patterned micropanels were created to limit the flow of the liquid crystal in the final large panel. However, these additional structures reduce the optical performance of the cell and create additional effects such as diffraction. In optical device applications, a device without the presence of these polymer walls and structures are needed to avoid any optical artifacts in the viewing area.

Other proposed solutions include, e.g., US Patent Application 2009/0128771, entitled "Fabrication Methods for Liquid Crystal Display Devices" (Yang et al.), which describes a roll-to-roll method of manufacturing cells using a "patterned enclosure structure" that includes a plurality of stripes for dividing liquid crystals. Another method uses patterned micro-polymer spacers to contain LC material within small confined spaces. For example in a method described in Wen-Tuan Wu et al. "P-55: Cell filling of Flexible Liquid Crystal Displays Using One Line Filling and Tilted Roller Pressing", *SID 07 Digest*, p 393 (2007), micro-polymer spacers that are 10 μm wide×170 μm long×3 μm high are formed on one substrate in order to contain the liquid crystal material in small, rectangular spaces, therefore making manufacture of a large cell possible. Other examples of patterned spacers include the method of Liang et al., U.S. Pat. No. 7,850,867 entitled "Compositions for liquid crystal display."

Other methods include providing a "support layer" made of a material capable of absorbing or binding LC material so as to make the LC layer dimensionally stable in thickness and of sufficient thickness to perform. See U.S. Pat. No. 5,868,892.

While plastic substrates lend themselves to a roll-to-roll type of manufacturing with reduced costs and increased manufacturing efficiency, previous efforts to implement a roll-to-roll continuous manufacturing process for various flexible displays have not been successful. The manufacture of large surface area flexible displays has been particularly illusive. One reason is that in liquid crystal devices, such as displays or optical devices, it is essential that the liquid crystal layer (i.e. the liquid crystal material together with any dyes mixed therein) have an optimum uniform thickness, because variations in thickness cause variations or gradations in optical properties of the liquid crystal device. In addition, the varying thickness of the liquid crystal material will cause corresponding variations in the electrical properties of the liquid crystal material, such as capacitance and impedance, further reducing uniformity of a liquid crystal device, especially one with a large size. The varying electrical properties of the liquid crystal material may also cause a corresponding variation in the effective electric field applied across the liquid crystal material. Additionally, in response to a constant electric field, areas of the liquid crystal that are of different thicknesses would respond differently. Thus, there should also be an optimum spacing of the electrodes by which the electric field is applied to the liquid crystal material. To maintain such optimum thickness and spacing, rather close tolerances must be maintained. To maintain close tolerances, there is a limit as to the size of the device using such liquid crystals, for it is quite difficult to maintain close tolerances over large surface areas. In addition, the amount of liquid crystal must be controlled as is the case in vacuum based processing. However, in a rolled based plastic process, the presence of vacuum is best avoided for the reasons stated above.

For these reasons, large size single cell liquid crystal devices, such as for example a sunroof or window, have not been made satisfactorily, mainly because of the fluidity of the liquid crystals, i.e. the tendency of the material to flow, creating areas that have different material thicknesses resulting in non-uniform optical and electrical characteristics.

Generally, it has been conventional thought that other than using the various encapsulation/patterned spacer methods described here, it is not possible to make a flexible cell filled with a fluid electro-optical mixture, such as a liquid crystal, using a roll-to-roll, roll to sheet, roll to part or continuous manufacturing process (here collectively referred to as roll-to-roll). This is because of the difficulty of working with flexible plastics, having to maintain a controlled distance between the two substrates at about 5-20 μm with only a variation (tolerance) of +/−1-2 μm; the precision required to fill the controlled gap between the top and bottom substrates with an amount of liquid crystal sufficient to fill the entire gap without forming bubbles or defects; and the fluid nature of the liquid crystal, which requires either having to stabilize the LC using polymerization or encapsulation, and/or having to use spacers that can form discrete patterns, all of which result in "haze" which is undesirable.

Therefore, there remains a demand for an efficient manufacturing method for flexible, plastic, substantially polymer-free liquid crystal devices.

SUMMARY

Disclosed herein is a continuous method of producing a flexible cell unit enclosed by a frame-like border seal, in which two flexible substrates separated by a controlled distance maintained by unpatterned spacers are assembled together and roll-filled with an electro-optic material (EOM) during the continuous production process. The term "roll-filled" and "roll-filling" as used herein refers to filling the space between the flexible substrates or the active area of the cell with the EOM using one or more lamination rollers so that the electro-optic material completely fills the controlled distance between the substrates. In some embodiments, the roll-filling is achieved without using vacuum (vacuum-less method).

In one embodiment, the method includes: providing two continuous sheets of flexible plastic material to form a first (e.g. bottom) substrate and a second (e.g. top) substrate; depositing an electro-optic material on the first substrate; using a lamination roller to mate the second substrate with the first substrate and to roll-fill the cell (or sheet) with the electro-optic material so that the electro-optic material fills the controlled distance between the first and second substrates. The border sealant may be applied before the step of depositing the EOM or after the EOM has been deposited.

In some embodiments, a border sealant is applied before the roll-filling step, so the method includes the step of applying a border sealant on the first and/or the second or both substrates before depositing the EOM, and a step of curing the border sealant to form the border seal before or after the roll-filling step. In this method, the electro-optic material can be deposited on an area outside the perimeter of the border sealant (FIG. 3A). Alternatively, the electro-optic material can be deposited inside the perimeter of the border seal (FIG. 3B). In other embodiments, the EOM may be deposited both outside and inside the perimeter formed by the border sealant, in one or a variety of shapes. (FIG. 3C-F). This method can have a further step of cutting the flexible cell unit from the two continuous sheets of flexible plastic material using a mechanical cutter (e.g. a xy-cutter or die cutter), or a laser cutter, or a combination thereof, or any other cutting/separation technique known in the art.

It may be advantageous in some cases for the border sealant to be printed on both the top and bottom substrates. In this embodiment, during the roll-filling process EOM flows between the top and bottom border sealants rather than strictly over the bottom border sealant. This ensures that the border sealant has contact to each substrate surface. This promotes adhesion and stability of the seal.

In some cases, more than one border sealant may be applied, e.g. two or more types of adhesive may be employed to provide the border seal, each adhesive providing a different functionality, e.g. an adhesive function vs. a non-interacting function.

In other embodiments, the EOM is applied first, then the border sealant is applied and the cell is roll-filled. In one embodiment, the border sealant is cured before the roll-filling step. In another embodiment, the border sealant is cured after the roll-filling step.

When a border sealant is present, it has a viscosity>1000 centipoise (cP), >2000 cP, >3000 cP, >4000 cP, or >5000 cP. In some embodiments, the viscosity is less than 10,000 cP, 20,000 cP, 30,000 cP, 40,000 cP, 50,000 cP, 60,000 cP or 70,000 cP. In some embodiments, the ratio of the border seal viscosity to EOM viscosity is greater than 5, 6, 7, 8, 9, 10, 20, 30, 40, or 50.

In some embodiments of this method, the electro-optic material does not chemically interact or interacts only minimally with the border sealant. In some examples, multiple (i.e. more than one) border sealants may be applied to one or both substrates.

In another embodiment, a border seal is created after the roll-filing step using a laser or heating element or similar welding method used to seal around the roll-filled cell. The laser is able to melt the top and bottom substrates together to form a continuous seal around an active area. The laser can also be configured to simultaneously cut an individual cell from a sheet while creating the seal. The steps in this method include: providing two continuous sheets of flexible plastic material to form the first (bottom) substrate and the second (top) substrate; depositing an electro-optic material on the first (or second) substrate; using a lamination roller to mate the second substrate with the first substrate to form a cell filled with the electro-optic material and having a controlled distance maintained by unpatterned spacers; then laser cutting a shape to form a border seal and to separate the flexible cell unit from the two continuous sheets of flexible plastic. In this method, a border sealant is not applied before the roll-filling step. Rather, the border seal is created after the roll-filling step.

In any of the methods described above, the sheets of flexible plastic may be pre-coated with unpatterned spacers, or the process can further include a step where the unpatterned spacers are applied onto the first substrate, or the second substrate, or both. In yet other embodiments, the spacers may be deposited within the electro-optic material. Or, alternatively, the spacers may be deposited within an alignment layer on the first substrate, the second substrate, or both.

In some examples, the spacers may be printed onto one or both substrates. The distribution of the spacers must be such that they produce only minimal or no diffraction patterns. Therefore the term "unpatterned spacers" refers to spacers with a random or a non-diffraction producing pattern.

Moreover, in most examples described herein, the spacer count (or density of the spacers) is kept at >80 per square mm.

In any of the embodiments described above, the substrates may include a conductive layer (e.g. indium tin oxide or ITO) for application of a voltage or electric current to the electro-optic material. Accordingly, the sheets of flexible plastic may be pre-coated with a conductive layer, or the process can further include a step where conductive layer is applied to the first and second substrates.

The first and second substrates may also include an alignment layer to assist with alignment of the EOM molecules. The alignment layer may already be present on the continuous sheets of flexible plastic material (pre-coating). Alternatively, the method may include a step of depositing the alignment layer on the first substrate, the second substrate, or both. The alignment layer may be applied to the entire surface of the first or second substrate sheets, or applied selectively to a selected active area on one or both first and second substrates. Active area refers to the area on the substrate that is to be filled by the electro-optic material and bordered by the border seal. Selective application may be achieved using various techniques, for example, screen printing, inkjet printing, planar coating, roller pressing, thermal pressing, phase separation out of a mixture or other methods known in the art. In some cases this is a self assembling monolayer that can produce a desired alignment.

In some embodiments, the alignment layer may contain spacers that maintain the controlled distance between the substrates.

The electro-optic material includes any material that can be altered by the application of an electric current or voltage. Examples include liquid crystals, electro-chromic materials, SPD etc.

In some embodiments, the electro-optic material as a whole is not polymerizable and non-encapsulated or does not contain more than 1%, 2%, 3%, 4%, 5% polymerizable material. In some examples, the electro-optic material includes a non-polymerizable, non-encapsulated liquid crystal, or a liquid crystal-dye mixture. In some examples, the electro-optic material is a guest-host dichroic dye-liquid crystal mixture. In some examples, the EOM is non-discrete. In other embodiments, especially where the flexible cell is large, the EOM may be divided/partitioned into discrete areas by application of partition walls in addition to unpatterned spacers, to assist in maintaining the controlled distance between the substrates.

The electro-optic material can be deposited in drops, lines or shapes or sheets in continuous film on the first substrate using any deposition means known in the art. (FIGS. 3-5)

When the EOM contains a liquid crystal mixture, the substrates can be coated with an alignment layer and the method can include a step of treating the alignment layer to allow proper alignment of liquid crystal molecules (and/or dye) with the substrates. "Treated," as used here, includes any number of ways known in the art to produce a desired alignment of the liquid crystal. For example, the alignment layer polyimide (PI) could be physically rubbed with a soft cloth. Alternatively, while the PI is drying it could be aligned with air jets. Also known are photo-alignable alignment layers that induce alignment with UV light, etc.

In some embodiments, the flexible cell unit is an optical device. An "optical device" refers to a device having optical properties suitable for a user to be able to look through the device without significant distortion of the image seen through the device. An optical device, then, is distinct from a traditional display, because typically a user does not look through a display at an image. Examples of optical devices include glasses, goggles, visors, protective eyewear, sunroofs, windows, fenestrations, etc. In some examples the optical device has a haze value less than 15%, 10%, 7%, 5%, 3%, 2% or 1%.

In some examples, the flexible cell unit is an optical device containing a liquid crystal-dichroic dye mixture capable of switching between a high transmission "clear" state and a low-transmission "dark" state with application of different voltages. Such guest-host liquid crystal-dye mixtures are well suited to the manufacturing method disclosed herein because of the cell's relatively higher tolerance for variations in the cell gap.

One of the many advantages of the inventive method described herein is that it can be performed as a vacuum-less method. But it can also be performed under vacuum, if required.

BRIEF DESCRIPTION OF THE DRAWINGS

FIGS. 3A-F are schematic views of various examples of the placement of the EOM in relation to the border seal during a roll-filling process, showing examples of various EOM deposition patterns.

FIGS. 5A-C show examples of various EOM deposition patterns that can be used with the method shown in FIG. 4.

FIG. 7 is a schematic view of an example of a double roller roll-filling method.

FIG. 8 is a schematic view of an example of a vertical roll-filling method.

DETAILED DESCRIPTION

Disclosed herein is a method of producing a flexible cell unit enclosed (edge sealed) by a border seal and filled with an electro-optic material (EOM). Generally, the method includes providing two continuous sheets of flexible plastic material to form the first (e.g. bottom) substrate and the second (e.g. top) substrate; depositing or dispensing a quantity of an electro-optic material on the first substrate; and using a lamination roller to (a) mate the second substrate with the first substrate and (b) to roll-fill the cell with the electro-optic material so that the electro-optic material fills a controlled distance between the first and second substrates.

Figure 1:
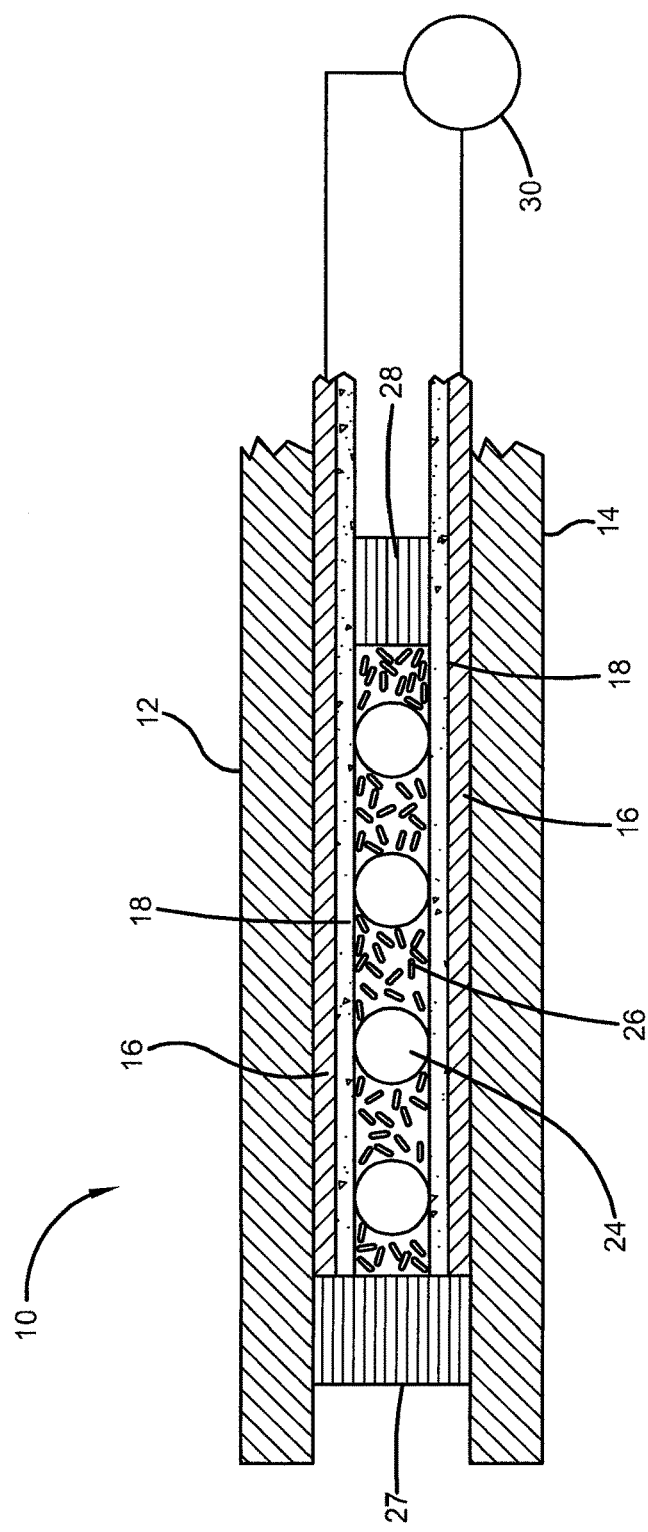
FIG. 1 is a schematic cross sectional view of a flexible cell unit.

FIG. 1 is a schematic diagram of a flexible cell unit 10. The cell 10 includes top and bottom flexible plastic substrates 12, 14, respectively. Depending on the application, the substrates may be coated with a conductive layer 16. Optically clear conductive layers include Indium Tin Oxide (ITO), conductive polymers, conductive nanowires and the like. Alternatively or in addition, the substrates may also be coated with an alignment layer 18, such as a polyimide or the like.

The flexible substrates 12, 14 are made of clear flexible plastics suitable for constructing flexible cell units such as polycarbonate (PC), polycarbonate and copolymer blends, polyethersulfone (PES), polyethylene terephthalate (PET), cellulose triacetate (TAC), polyamide, p-nitrophenylbutyrate (PNB), a polyetheretherketone (PEEK), a polyethylenenapthalate (PEN), polyetherimide (PEI), polyarylate (PAR); or the like as known in the art. Many of these substrates are commercially available from e.g. Mitsubishi Plastics or Teijin DuPont films and come standard with various coatings such as hard coats.

The flexible substrates 12, 14 are separated by a controlled gap or distance, which is maintained by spacers 24. The volume between the substrates is filled by an electro-optic material 26.

The spacers 24 are used to maintain a controlled distance or gap between the substrates. In some embodiments, the controlled gap is 3, 4, 5, 6, 7, 8, 9, 10, 11, 12, 13, 14, 15, 16, 17, 18, 19, 20, 30, 40, 50, 60, 70, 80, 90, or 100 µm in size. In some examples, the controlled gap is preferably 5, 6, 7, 8, 9 or 10 µm, in size. A "controlled" gap or distance means the variation in the distance between the substrates should remain on the average less than 30% of spacer diameter (which determines the controlled gap). In some examples, the variation is less than 25%, 20%, 15%, 10% or 5% of the spacer diameter.

Generally, two kinds of spacers are used to maintain a controlled distance between substrates. One category are "patterned spacers", which are spacers that are either purposefully placed or created on a substrate to form a particular pattern of repeated geometry, or they are created using a photolithography/polymerization or similar method known in the art and which produce a diffraction pattern. Examples include polymer walls. Other examples include the patterned spacers used in Wen-Tuan Wu et al. "P-55: Cell filling of Flexible Liquid Crystal Displays Using One Line Filling and Tilted Roller Pressing", SID 07 Digest, p 393 (2007). Wu et al., uses a photolithography technique to form patterned micro-polymer spacers (10 µm wide×170 µm long) that are elongated to create long rows of liquid crystal. Typically, these spacers have a length and width that are larger than the cell gap, i.e., they possess an aspect ratio of long side to cell gap that is >20 in a pattern that can produce visible patterns in the device.

In contrast to the above, the present method uses "unpatterned spacers" to maintain the controlled distance between the substrates. "Unpatterned spacers", as defined herein, are spacers that are placed randomly (e.g. sprayed on) or printed where they are positioned in a way so as not to produce optical aberrations such as diffraction patterns, etc. The unpatterned spacers of the present application can be spherical or they can be oblong with an aspect ratio (length/width) less than 10/1 or 5/1, 4/1, or 3/1. The spacers are used to maintain a distance between the substrates of 3-100 µm, preferably 4-20 µm.

Another distinction of the method described here is that the spacer count or density. The method works well when the substrates are covered with a greater density of smaller spacers than when long patterned spacers are placed in select locations. For example, in some embodiments, the spacer count is kept at >80 per square mm (mm²).

In some embodiments, the spacers 24 may be pre-applied to the substrates (e.g. the continuous sheets are pre-coated with spacers) or may be applied to the substrates during the roll-to-roll process, for example sprayed on or applied in a layer where the spacers are randomly arranged or are arranged in a non-diffraction-producing pattern. They may be dispersed using a wet or dry method as known in the art. They may also be placed within the alignment layer, during a pre-coating process or during the roll-to-roll manufacture process. The spacers may also be coated with an adhesive layer.

Spherical spacers are distinct from the spherical encapsulated liquid crystals such as those described in FERGASON, Patent Application of, PCT/US1982/001240 (WO/1983/001016) entitled: "Encapsulated Liquid Crystal and Method", because they do not encapsulate any volume of the EOM.

In certain embodiments, the spacers 24 can be deposited inside or as part of the alignment layer, so that they are applied when the alignment layer is applied to one or both substrates. In other embodiments, the spherical spacers 24 can be integrated into the electro-optic material that is deposited onto the substrates.

The cell 10 further includes a border seal (edge seal) 27/28, which contains the EOM inside the cell and forms a barrier between the outside environment and the EOM, preventing the EOM from flowing out of the cell as well as preventing environmental factors (air, moisture, debris) from getting inside the cell. In some examples, the border seal is formed by applying a border sealant to one or both of the substrates, which when brought together and cured, will form the border seal around the electro-optic material contained within the cell. FIG. 1 shows the variation in the border seal depending on the various coatings on the substrates when the border sealant is applied. In FIG. 1, on one side, border sealant 27 seals the flexible substrates 12, 14 together. Alternatively, the border seal arrangement can be as pictured on the other side of the cell with border sealant 28 sealing the gap between the alignment and/or conductive layers. The particular arrangement will depend on the timing and method of the border sealant application In some embodiments the border sealant has a viscosity less than 70,000 cP and greater than 1000 CentiPoise (cP), 2000 cP, 3000 cP, 4000 cP, or 5000 cP during the roll-filling process. This includes thermal adhesives that decrease in viscosity when heat is used to assist the bonding, as well as thixotropic adhesives, that change viscosity in response to pressure. In some embodiments, the ratio of the border seal viscosity to EOM viscosity is greater than 5, 6, 7, 8, 9, 10, 20, 30, 40, or 50. In some examples, a border seal with a viscosity of 6000 cP has been used successfully. The viscosity of the border sealant affects the integrity of the cell because if the viscosity of the border sealant is too low, it can mix with the EOM during processing promoting a chemical interaction or flowing with the liquid crystal during the roll filling process and depositing on the substrate's surface in undesired locations. If the border sealant is too viscous, the controlled gap or distance around and close to the border seal are not uniform.

In some examples, it is advantageous if the border sealant material experiences minimal or no chemical interaction with the electro-optic material 26 over a long period of time, typically more than 6 months, more than 1 yr, more than 2 yrs, etc. For example, we found that over time (e.g. six months or greater), the sealant can deteriorate or interact with the electro-optic material (e.g. liquid crystal) inside the cell to form micro-pores that allow air to creep into the cell, thus forming bubbles or imperfections. In some examples, it is advantageous if the border sealant is non-porous to the EOM or its components. For example, we found that porous border sealants reduce the life time of the device by adsorbing some of the EOM components. Some boarder sealants have exhibited chemical interaction in the form of unwanted discoloration of the liquid crystal near the border seal. In some instances of chemical interaction the border sealant itself becomes discolored. These interactions are undesirable.

The border sealant can be applied using any technique known in the art, such as a e.g. using brushes, rollers, films or pellets, spray guns, applicator guns, screen printing, inkjet printing, flexographic printing, planar coating, roller pressing, thermal pressing, etc. All of these can be done manually or can be automated into a machine, or a combination thereof. The border sealant can be a suitable adhesive (UV, thermal, chemical, pressure, multi-part epoxies, and/or radiation cured), polyisobutylene or acrylate-based sealants, and so on, or a pressure sensitive adhesive, a two-part adhesive, a moisture cure adhesive, etc. Other types of border (edge) seal can be composed of metallized foil or other barrier foil adhered over the edge of the cell. It has been found that hybrid radiation and thermal cure sealants (i.e. UV curable with thermal post-bake) offer certain advantages. For example, Threebond 30Y-491 material (from Threebond Corporation, Cincinnati, Ohio) is especially useful because of its favorable water vapor barrier properties, low viscosity at elevated temperature for easy depositing of the edge seal material, good wetting characteristics, and manageable curing properties. Those skilled in the art and familiar with advanced sealants will be able to identify other sealants that offer comparable performance.

The cell 10 is filled with an electro-optic material (EOM). The electro-optic material can be any material that is responsive to an electric field applied across the cell so as to have a desired operating characteristic intended for the device, and includes any material that can be altered by the application of an electric current or voltage. For example, the EOM may be one or a combination of a liquid crystal material, an electro-chromic material, a suspended particle device (SPD), with other additives such as dyes (dichroic dyes, pleochroic dyes, etc.), and the like, where the electro-optic material can be altered by the application of an electric current or voltage. In a preferred embodiment, the EOM is a guest-host liquid crystal-dichroic dye mixture.

In some embodiments, the electro-optic material as a whole is not polymerizable, non-encapsulated and non-discrete. Thus, the EOM material excludes polymeric or encapsulated liquid crystal compositions such as PDLC, PELC, PSCT, PNLC, NCAP, etc.

As used herein, "not polymerizable" means an EOM composition that does not include any chemical components (e.g. polymer) in an amount necessary to dimensionally stabilize the EOM layer by changing the phase of the material to a solid, a semi-solid, or a gel, etc.

"Non-discrete" means an EOM that is not divided into discrete, separate compartments by encapsulation, polymer walls, polymer networks, patterned spacers, or the like.

"Non-encapsulated" means an EOM that is not contained within the confines or interior volume of a capsule. A capsule refers to a containment device or medium that confines a quantity of an EOM material, such as a liquid crystal, so that an "encapsulated EOM" is a quantity of EOM confined or contained in an encapsulating medium, e.g. a polymer capsule. The capsules may have a spherical shape, or may have any other suitable shape. Encapsulated EOM (e.g. encapsulated liquid crystals) are made to prevent them from flowing. Examples of encapsulated EOMs include: polymer-dispersed liquid crystals (PDLCs), which consist of droplets of liquid crystals inside a polymer network.

"Roll-to-roll process" means the entire process the substrates experience, from unwinding from their corresponding roll to manufacture of a cell.

For example, a method of microencapsulation is described by FERGASON in U.S. Pat No. 4,435,047 entitled: "Encapsulated liquid crystal and method" (1984) and in Patent Application PCT/US1982/001240 (WO/1983/001016) entitled: "Encapsulated Liquid Crystal and Method." In this method, a resin material is used to encapsulate the liquid crystal (LC) material to form curved, spherical capsules containing discrete quantities of LC material. These are made by mixing together LC material and an encapsulating medium (e.g. resin) in which the LC material will not dissolve and permitting formation of discrete capsules containing LC material. In the micro-encapsulation, the liquid crystal is mixed with a polymer dissolved in water. When the water is evaporated, the liquid crystal is surrounded by the polymer. A large number of tiny "capsules" are produced and distributed through the bulk polymer.

Materials manufactured by encapsulation are referred to as NCAP or nematic curvilinear aligned phase.

There are other methods of preparing PDLCs, PSCTs, PNLC such as phase separation, e.g. Polymerization Induced Phase Separation (PIPS). With PIPS, droplets of LC are excluded from the bulk via phase separation as polymeric chains grow in molecular weight—the LC becomes encapsulated into micron-sized droplets by solid polymer walls. Once encapsulated, the liquid crystal cannot flow between the substrates or leak out if the substrates are cut. This method is described in, for example, Schneider et al., *SID Int. Symp. Digest Tech. Papers,* vol. 36, p. 1568 (2005); and Schneider t. "New Developments in Flexible Cholesteric Liquid Crystal Displays" Emerging Liquid Crystal Technologies II, *Proc. of SPIE,* Vol. 6487, 64870J (2007).

When the electro-optic material includes a "guest-host" liquid crystal-dye mixture, the mixture includes a quantity of one or more dichroic dye "guests" mixed inside a liquid crystal "host" solution. The liquid crystal "host" molecules have an axis of orientation that is alterable by adjustment of a voltage applied across the substrates. The "guest" dye mixture includes one or more dichroic dyes which are dissolved within the liquid crystal host, align with the orientation of the liquid crystal molecules and whose absorption of polarized light strongly depends on the direction of polarization relative to the absorption dipole in the dye molecule. An applied voltage results in a switch between a first state, where the guest-host orientation allows maximum light transmission, referred to here as the "clear state", and a second state, where the guest-host orientation allows minimum light transmission, referred to here as the "dark state", and a combination of intermediate states, between the fully clear and fully dark states. Depending on the composition of the guest-host mixture, the clear state can occur at zero voltage (Off state). Alternatively, the mixture may be formulated so that zero voltage (Off state) corresponds to a dark (min. transmission) state.

Cells containing guest-host liquid crystal-dye mixtures are particularly well-suited for manufacture according to the methods described herein because of their greater tolerance for variation within the cell gap, i.e. the cell is more forgiving and can function well even if the cell gap has slight variations (within acceptable limits such as +/−5%, 10%, 15%, 20%, 25% or even 30%) as compared with cells relying on phase retardation, such as polarizer-based LC devices, where the tolerance or variation in cell gap has to be kept to <1%.

In some embodiments, the guest-host liquid crystal-dye mixtures described above are used to attenuate light in an optical device. An "optical device" refers to a cell which is a primarily transmissive device through which users can see objects (e.g. a pair of glasses, goggles, visors, or a window).

A device having a clear (maximum transmission) state at zero voltage (Off state) can be achieved, for example, where the guest-host liquid crystal-dye mixture has a homeotropic alignment (i.e. perpendicular to the substrates) when no voltage is applied, the liquid crystal host has negative dielectric anisotropy and the dichroic dyes have positive dichroism (i.e. having maximal absorption when the polarization is parallel to the long molecular axis of the dye molecule and a minimal absorption when the polarization is perpendicular to the long axis). In such a device, when upon application of a voltage (ON state), the guest-host mixture assumes a planar or homogeneous alignment (i.e. parallel to the substrates) and becomes maximally light absorbing (dark). Such an arrangement can be used in, for example, goggles, eyewear, visors, etc., where it may be desirable to "darken" the device in response to a voltage applied when there is bright light. Other applications include windows (vehicles, buildings, aircrafts, etc.) and sun/moon roofs, etc.

In other examples the reverse alignment can be implemented so that the guest-host liquid crystal-dye mixture can have a planar alignment (homogeneous) in a dark state, when the applied voltage is OFF, and a homeotropic alignment in the clear state when voltage is applied. This can be achieved by use of a planar surface treatment for the alignment layers in conjunction with a dye having positive dichroism and a liquid crystal material with positive dielectric anisotropy. Such an arrangement may be used in, for example, a window or sunroof, where it is desirable for the device to be normally in a "dark" state, but capable of switching to a clear state by application of a voltage.

Finally, the cell 10 may be connected to a control circuit 30 for application of an electric field or voltage across the cell. The voltage source may be either AC or DC.

Figure 2:
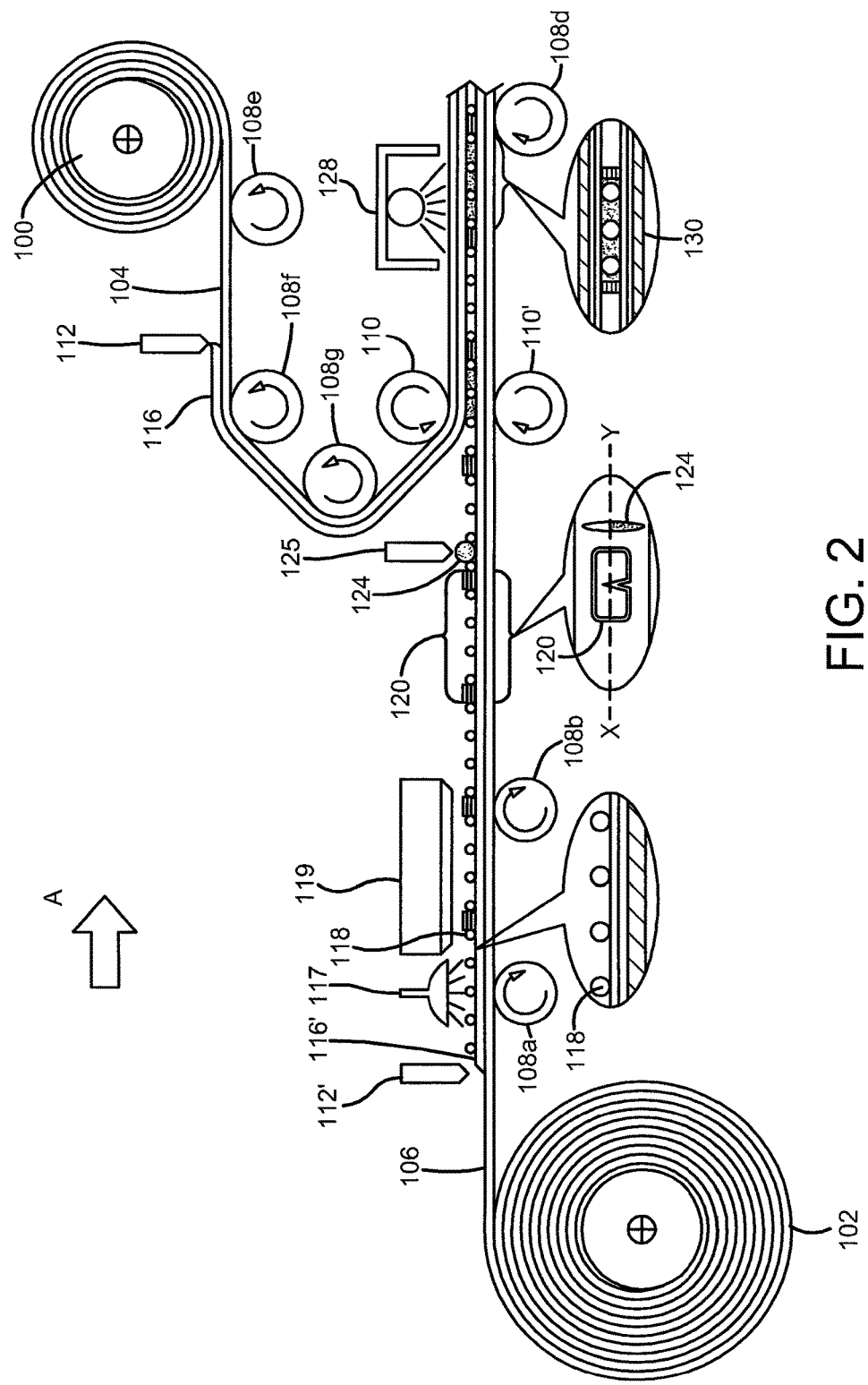
FIG. 2 is a schematic diagram of an embodiment of a roll-filling fabrication method of a flexible cell unit where the border sealant is applied before the roll-filling step.

One example of a roll-filling method for making cell 10 is illustrated in FIG. 2. In this example, two rolls of flexible plastic 100, 102, are used to form a top substrate 104 and a bottom substrate, 106, respectively. The continuous sheets of plastic are placed onto sets of rollers (108) that rotate and move the plastic sheets towards a set of lamination rollers 110, 110'. In this example, each continuous sheet of flexible plastic is previously coated with an ITO conductive layer. A set of applicators 112, 112' is used to apply a polyimide alignment layer 116, 116' onto the top and bottom substrates 104, 106. A spray applicator 117 is used to apply a layer of spherical spacers 118 onto the bottom substrate 106.

FIG. 2 shows the spacers being applied to the bottom substrate, but in other examples, the spacers may be applied to the top substrate, or to both the top and bottom substrates. Spacers may be applied to a single or both rolls of substrate before the roll-to-roll process. Spacers 18 may also be applied during the roll-to-roll process using any method known in the art, including wet or dry spraying, nebulizing, printing or wet coating in solution.

In some examples, the spacers may be embedded in and applied as part of the alignment layer. In yet other examples, the spacers may be embedded in and applied as part of the EOM when the EOM is deposited onto a substrate.

A screen printer 119 prints a border sealant pattern 120 on the bottom substrate 106 as the substrate rolls in direction A. In some embodiments the screen printer is a rotary screen printer and the top substrate, bottom substrate or both top and bottom substrates are printed with a border sealant.

A strip or line of an EOM such as a liquid crystal/dye mixture 124 is deposited onto the bottom substrate 106 close to but outside the area formed by the border sealant 120, using a depositing needle 125. Also contemplated herein is a method where the EOM 124 is deposited before the border sealant 120.

The lamination rollers 110, 110' are then used to bring together and "mate" the top substrate 104 and the bottom substrate 106, while the pressure from the rollers pushes the EOM 124 to roll over the border seal 120 and into the "active" area inside the perimeter of the border sealant 120, thus forming a cell 130 filled with the EOM 124. The "mating" of the top and bottom substrates brings the top substrate 104 into contact with the border sealant 120, and into contact with spacers 118, which separate the top and bottom substrates by the width of the spacers. The spacers 118 maintain a controlled distance or "gap" between the top and bottom substrates, which in turn is filled with the EOM 124.

Finally, the border sealant 120 is cured by a curing apparatus 128 and the cell 130 is cut and removed from the rolling plastic sheets. However, it is possible to first cut and separate the cell and then cure the border seal using UV light, heat, pressure, chemical interaction, moisture, or a combination thereof, or any means for curing the border sealant. Sections of mated substrates, containing cells, can be cut into sheets contain cells. The cells can then be cut out by other methods either mechanically or optically. Mechanical means include die cutting, cutting with an x-y razor blade, or scissors, etc. Optical cutting includes laser cutting, etc.

The electro-optic material can be deposited on either the inside or the outside of the perimeter of the border seal, as shown in FIG. 3A-3B. In other examples, the EOM may be deposited in various areas both inside and outside the border sealant (FIGS. 3C-3F). The electro-optic material can be selectively deposited in drops, lines, or shapes, as shown in FIG. 3.

If part or all of the EOM is deposited outside the border sealant perimeter, pressure from the lamination roller causes the EOM to roll over the border sealant in order to fill the active cell area. Therefore, it is preferable to have minimal interaction between the electro-optic mixture and sealant so one does not interfere with the function of the other.

Border-Less Processing

Figure 4:
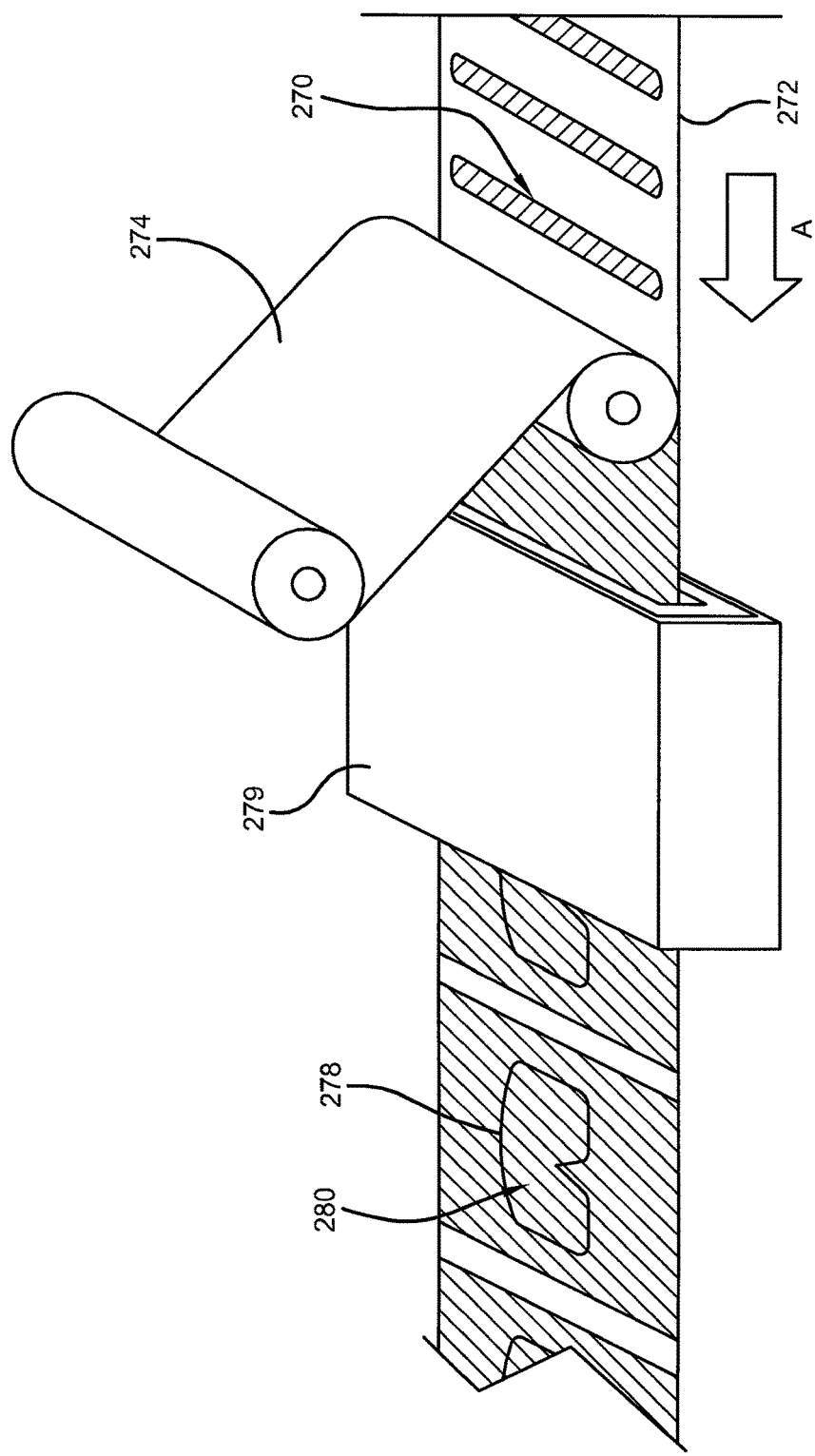
FIG. 4 is a schematic view of another embodiment of a roll-filling method where the border seal is created after the roll-filling step.

In another embodiment of the method of manufacture, shown in FIG. 4, no border seal is applied before the roll-filling step. Rather, a quantity of an EOM 270 is applied onto a substrate 272, then the two substrates 272, 274, which have been pre-coated as desired, are brought together and roll-filled with the EOM, their separation maintained by spacers on one or both substrates. The step of roll-filling may be performed by a single or by double rollers.

An edge seal 278 is created by a laser-cutting or laser-welding apparatus 279 which acts to cut a shape and create a border seal at the same time, and an EOM-filled flexible cell unit 280 is created and separated from the remainder of the continuous sheet of plastic. Alternatively, a two step method may be employed where the substrates are first welded together without separating the cell from the mated substrates, and then the cell is cut and/or separated from the remainder of the sheet. The welding step can be performed with a laser, heat, or a combination of both.

FIGS. 5A-C show various patterns of EOM deposition in the border-less method shown in FIG. 4. As can be seen, the EOM s deposited in discrete patterns or as a "sheet" covering most of the area on one (or both) substrates.

Any of the methods described herein can be used to manufacture large area devices, i.e. anything having an area greater than 30 cm², 40 cm² or 50 cm²; or any cell over 10 cm long.

In some embodiments, the process is performed without using a "film guider". A "film guider" is a rigid sheet used to guide, usually the top substrates, into the proper alignment. Such a top film guider is described in Wu et al. "P-55: Cell filling of Flexible Liquid Crystal Displays Using One Line Filling and Tilted Roller Pressing", *SID 07 Digest*, p 393 (2007). However, its use has the disadvantage that such a "guider" can easily touch and scrape the top substrate, therefore scratching it or scraping off coatings such as the conductive and/or alignment layer.

The method described herein can also be implemented without using a "plate" to carry one or both substrates. For example, in Wu et al., the bottom substrate is fixed to a "stage" or a plate. This plate can be the limiting factor in the size of the cell manufactured. In order to create a large cell (e.g. display, window), a large plate is needed. This takes up valuable space in a clean room environment. Additionally, each different sized cell would require a different size plate. Moreover, using a stage to move the substrate is problematic in large flexible cell manufacture because the gap between the substrates needs to be maintained constant, with a low variation (e.g. tolerance of +/−15% or 1-3 μm) for the cell to operate correctly. But the stage itself is often not completely flat, so with larger cells, it becomes increasingly difficult to maintain such a low tolerance.

When the roll-filling method described here does not use a plate or stage, the movement of the plastic substrates is made possible by the movement of the rollers. Therefore, the method can be adapted to create various size cells rapidly and easily. For example, one length cell can be made and the very next cell can be a different length, with no retooling steps and no material waste.

The mating (lamination) step between the two substrates can be achieved using one or two rollers. When using two rollers, the pressure and or gap between the two rollers is used to laminate the two substrates. The rollers can be made from rubber, metal or a combination thereof where, for example, one roller has a rubber and the other roller has a metal outer layer. It is well known in the art that in roll-to-roll fabrication, the diameter of the roller and plastic strength must be tuned to avoid damage.

When the lamination is achieved using a single roller, the tension in the web is the primary source of pressure. In one example, the two substrates are allowed to move around a roller, each, and the lamination pressure is achieved due to the tension on the roll.

The substrates may be prelaminated to a protective film for protection against scratches from the process, or to increase its thickness or alter the tensile strength. Further, the substrates may be pretreated by functional coatings such as antifog, antireflection, hardcoats, slip layers etc.

In the examples below, we describe how a flexible liquid crystal cell is manufactured according to the method described herein.

EXAMPLE 1

Two substrates pre-coated with ITO and alignment layer PI are placed on a set of rollers, one to form a top substrate and the other forms a bottom substrate
Bottom substrate is sprayed with unpatterned spacers,
A border sealant is printed onto the bottom substrate
A line of liquid crystal/dye mixture is deposited outside the perimeter of the border sealant
A roller is used to bring the top and bottom substrates together and roll-fill the active area inside the perimeter of the border sealant with the liquid crystal/dye mixture
The border sealant is UV cured to form an edge seal

EXAMPLE 2

Single Roller

Figure 6:
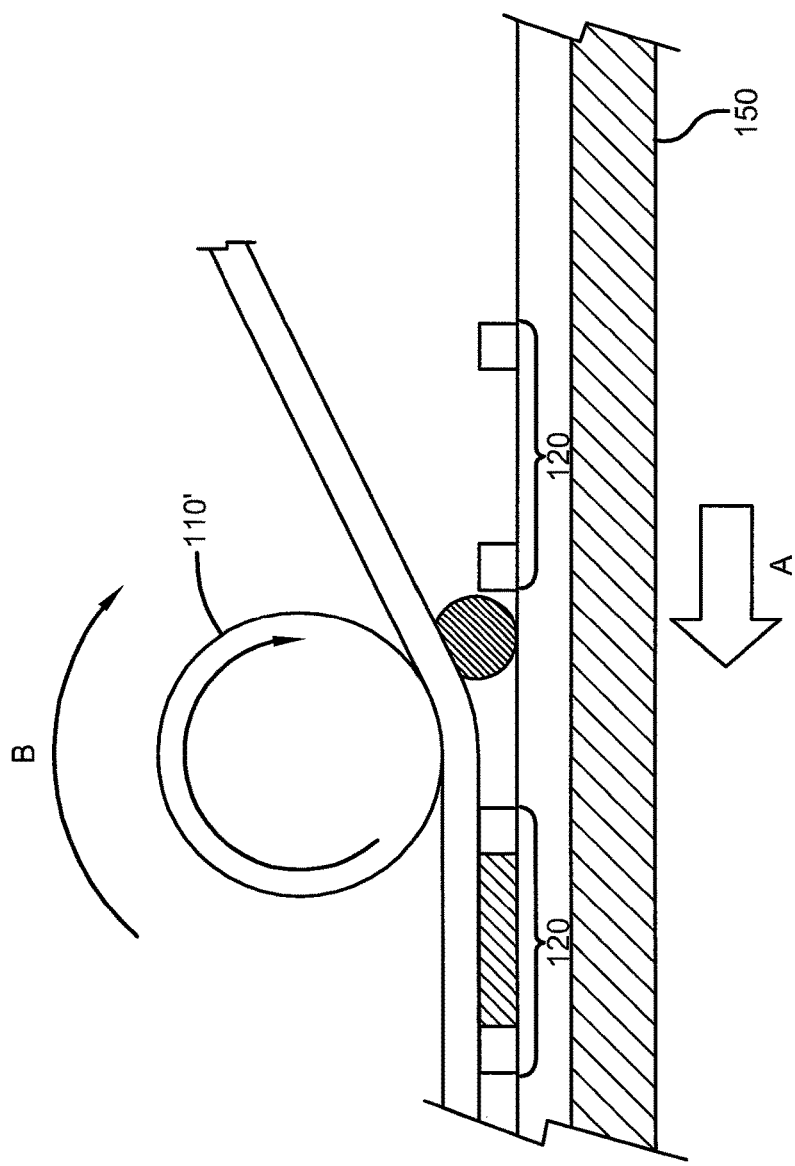
FIG. 6 is a schematic view of an example of a single roller roll-filling method.

In another example, shown in FIG. 6, the bottom substrate may be placed onto and fixed to a moving plate 150 and a single roller (110') used to roll-fill the cells 120. In this example, either the moving roller 110' can cause the movement of the plate and/or the bottom substrate in direction A, or the moving plate 150 moves the bottom substrate and causes the roller to roll in direction B, pairing the substrates and roll-filling the cell.

EXAMPLE 3

Double Rollers (Top and Bottom)

In this example (FIG. 7), a set of top and bottom rollers 200, 202 are used to mate or pair the top flexible substrate 204 to the bottom flexible substrate 206. A border sealant 208 is applied to the bottom substrate 206. The rollers 200, 202, pull the flexible substrates though the rollers in the web direction A. While rolling, the deposited electro-optic mixture 210 simultaneously fills the controlled gap created between the two substrates 204, 206, while they are being paired.

This method can be adopted in a continuous roll-to-roll type process. The amount of OEM deposited on the substrates need not be so carefully gauged as the process also works when more OEM is used, resulting in a quantity of EOM flowing over the border seal during the roll-filling step. This is an advantage over prior methods of manufacture, which required deposition of a very precise amount of OEM required to fill the cell such that the cell would be completely filled but the border sealant would only minimally touch the LC.

EXAMPLE 4

Double Roller (Left and Right)

In this example, a set of left and right rollers 250, 252, are used to pair the flexible substrate 254 with flexible substrate 256 while moving the substrates in a vertical downward direction (FIG. 8).

Essentially the top and bottom rollers from the previously described method are now placed side by side. The difference is that in this new arrangement, the substrates 254, 256, come together from two different horizontal directions E and F, respectively. The rollers pull the flexible substrates though the rollers in the web direction G, which is vertically downwards. While rolling, the deposited EOM simultaneously fills the controlled gap created between the two substrates while they are being paired, as described previously. This set-up would make it easier to print or pattern any alignment layer on the substrates, and/or allow additional processing steps to be performed on one or both plastic sheets/substrates.

EXAMPLE 5

In another example, two rolls of substrate are each placed on rollers. Each roll is 3 mil PET from Mitsubishi plastics. The substrate rolls are pre-coated with a conductive layer, ITO, by Materion. The ITO coated substrates are then coated with a polyimide alignment layer, 5661 from Nissan Chemicals. Shinshikyu EW plastic spheres, 6 micron in diameter (Hiko Industrial Ltd, Hong Kong) are mixed into the polyimide during the coating process and are present in at least one of the substrate rolls. The rollers unwind the rolls of substrate during the roll-to-roll process. One unwound roll becomes the top substrate, the second becomes the bottom substrate. The substrates move though the roll-to-roll process at a web speed from about 0.5 inches per second to about 10 inches per second. Each substrate has a corresponding border sealant printer. In this case these printers are rotary screen printers. The rotary screen printers print the border sealant, Loctite 3108, on each of the active surfaces of the top and bottom substrate. Active surfaces are the surfaces that will be in contact with the EOM in the finished cell. A rotary printer will print a border sealant at a height from about 5 microns to about 100 microns, preferably from about 5 microns to about 40 microns. After rotary printing, EOM is deposited on the active surface of the bottom substrate by a syringe and needle dispenser. The EOM is a guest-host dichroic dye-liquid crystal mixture, AMI 577. A set of top and bottom lamination rollers mate the top and bottom substrates together such that the top border sealant is aligned with the bottom border sealant and the EOM makes contact with both top and bottom active surfaces and though the roll-filling process, fills the entire interior border sealant area. The lamination rollers are configured to be pressure rollers that apply constant pressure across the substrate during the lamination, or configured to be set-gap rollers where the top lamination roller is spaced at a set distance from the bottom lamination roller and allows the top and bottom substrates to mate without compressing the controlled gap and spacers between the top and bottom substrate. The mated substrates are cured after lamination by UV radiation, heat, or a combination of UV and thermal cure. The cured substrates are then cut from the roll into sheets for additional processing.

The invention claimed is:

1. A method of producing a flexible cell unit enclosed by a border seal and filled with an electro-optic material, the flexible cell having a first and a second substrate separated by a controlled distance, the method comprising:
   providing two continuous sheets of flexible plastic material to form the first and second substrates,
   applying a plurality of unpatterned spacers within the flexible cell unit to the first substrate, the second substrate or both,
   depositing an electro-optic material on at least one substrate, wherein the electro-optic material is non-discrete non-encapsulated, non-polymeric, and contains less than 1% polymerizable material;
   pairing the first and second substrates while roll-filling the flexible cell with the electro-optic material using one or more lamination rollers so that the electro-optic material completely fills the controlled distance between the first and second substrates.

2. The method of claim 1, wherein the method further comprises applying a border sealant on the first or second or both substrates before the roll filling step and curing the border sealant to form the border seal after the roll-filling step.

3. The method of claim 2, wherein the electro-optic material is deposited on an area outside the perimeter of the border sealant, an area inside the perimeter of the border sealant, or one or more areas both inside and outside the perimeter of the border sealant.

4. The method of claim 2, wherein during the roll-filling step, the ratio of border sealant viscosity to the electro-optic material viscosity is greater than 10.

5. The method of claim 2, wherein the method comprises applying multiple border sealants on the first, or the second, or both substrates.

6. The method of claim 1, wherein the method further comprises cutting the flexible cell unit from the two continuous sheets of flexible plastic material using a mechanical die cutter, or a laser cutter, or a combination thereof.

7. The method of claim 1, further comprising cutting or welding a shape to form a border seal after the roll-filling step using laser or heat or a combination of both.

8. The method of claim 1, wherein the unpatterned spacers are integrated into the electro-optic material that is deposited onto the at least one susbstrate.

9. The method of claim 1, wherein the method further comprises applying an alignment layer on the first substrate, the second substrate, or both.

10. The method of claim 9, wherein the method further comprises depositing the unpatterned spacers within the alignment layer.

11. The method of claim 1, wherein the method further comprises adding partition walls to one or both substrates.

12. The method of claim 9, wherein the alignment layer is deposited by printing the alignment layer on a selected active area of one or both the first and second substrates.

13. The method of claim 9, wherein the alignment layer is deposited by printing the alignment layer on the entire active area of one or both the first and second substrates.

14. The method of claim 1, wherein the flexible cell is an optical device having a haze value less than 8%.

15. The method of claim 1, wherein the method is vacuum-less.

16. The method of claim 1, wherein the unpatterned spacers are used to maintain a controlled distance of 3-100 µm in size.

17. The method of claim 1, wherein the electro-optic material is selectively deposited in drops, lines or shapes on the first substrate.

18. The method of claim 1, wherein the electro-optic material is a guest-host dichroic dye-liquid crystal mixture.

19. The method of claim 1, wherein the flexible cell unit has an area greater than 30 cm².

20. The method of claim 1, wherein the flexible cell unit has a length greater than 10 cm.

21. A flexible cell unit comprising:
first and second substrates separated by a controlled distance maintained by unpatterned spacers within the flexible cell unit, filled with an electro-optic material and enclosed by a border seal, said flexible cell unit produced using a method of manufacture comprising:
providing two continuous sheets of flexible plastic material to form the first and second substrates,
depositing the electro-optic material on at least one said substrate, wherein the electro-optic material is non-discrete non-encapsulated, non-polymeric, and contains less than 1% polymerizable material; and
roll-filling the cell by using one or more lamination rollers to pair the first and second substrates to within the controlled distance of each other and filling said controlled distance with said electro-optic material.

22. The flexible cell unit of claim 21, wherein said method of manufacture further comprises applying a border sealant on the first or second or both substrates before the roll filling step and curing the border sealant to form the border seal after the roll-filling step.

23. The flexible cell unit of claim 22, wherein said method of manufacture comprises depositing the electro-optic material on an area outside the perimeter of the border sealant, an area inside the perimeter of the border sealant, or one or more areas both inside and outside the perimeter of the border sealant.

24. The flexible cell unit of claim 21, wherein said border seal is formed by applying a border sealant and wherein the ratio of border sealant viscosity to the electro-optic material viscosity is greater than 10.

25. The flexible cell unit of claim 22, wherein said method of manufacture comprises applying multiple border sealants on the first, or the second, or both substrates.

26. The flexible cell unit of claim 21, wherein said method of manufacture further comprises cutting the flexible cell unit from the two continuous sheets of flexible plastic material using a mechanical die cutter, or a laser cutter, or a combination thereof.

27. The flexible cell unit of claim 21, wherein said method of manufacture further comprising cutting a shape to form the border seal and to separate the flexible cell unit from the two continuous sheets of flexible plastic after the roll-filling step.

28. The flexible cell unit of claim 21, wherein said method of manufacture further comprising welding a shape to form the border seal after the roll-filling step using heat or laser or both.

29. The flexible cell unit of claim 21, wherein the unpatterned spacers are integrated within the electro-optic material.

30. The flexible cell unit of claim 21, wherein said method of manufacture further comprises applying an alignment layer on the first substrate, the second substrate, or both.

31. The flexible cell unit of claim 30, wherein the unpatterned spacers are within or part of the alignment layer.

32. The flexible cell unit of claim 21, wherein said method of manufacture further comprises adding partition walls to one or both substrates.

33. The flexible cell unit of claim 21, wherein the flexible cell is an optical device having a haze value less than 8%.

34. The flexible cell unit of claim 21, wherein said method of manufacture is vacuum-less.

35. The flexible cell unit of claim 21, wherein the unpatterned spacers are used to maintain a controlled distance of 3-100 µm in size.

36. The flexible cell unit of claim 21, wherein the electro-optic material is selectively deposited in drops, lines or shapes on the first substrate.

37. The flexible cell unit of claim 21, wherein the electro-optic material is a guest-host dichroic dye-liquid crystal mixture.

38. The method of claim 21, wherein the flexible cell unit has an area greater than 30 cm².

39. The method of claim 21, wherein the flexible cell unit has a length greater than 10 cm.

40. A method of producing a flexible cell unit enclosed by a border seal and filled with an electro-optic material, the flexible cell unit having a first substrate and a second substrate separated by a controlled distance maintained by a plurality of unpatterned spacers within the flexible cell unit, the method comprising:
providing two continuous sheets of flexible plastic material as the first and second substrates, wherein the unpatterned spacers are pre-applied to at least one of the first and second substrates,
depositing an electro-optic material on at least one substrate, wherein the electro-optic material is non-discrete non-encapsulated, non-polymeric, and contains less than 1% polymerizable material; and
pairing the first and second substrates while roll-filling the flexible cell unit with the electro-optic material using one or more lamination rollers so that the electro-optic material completely fills the controlled distance between the first and second substrates.

41. The method of claim 40, wherein the method further comprises applying a border sealant on the first or second or both substrates before the roll filling step and curing the border sealant to form the border seal after the roll-filling step.

42. The method of claim 41, wherein the electro-optic material is deposited on an area outside the perimeter of the border sealant, an area inside the perimeter of the border sealant, or one or more areas both inside and outside the perimeter of the border sealant.

43. The method of claim 41, wherein during the roll-filling step, the ratio of border sealant viscosity to the electro-optic material viscosity is greater than 10.

44. The method of claim 41, wherein the method comprises applying multiple border sealants on the first, or the second, or both substrates.

45. The method of claim 40, wherein the method further comprises cutting the flexible cell unit from the two continuous sheets of flexible plastic material using a mechanical die cutter, or a laser cutter, or a combination thereof.

46. The method of claim 40, further comprising cutting or welding a shape to form a border seal after the roll-filling step using laser or heat or a combination of both.

47. The method of claim 40, wherein the method further comprises applying an alignment layer on the first substrate, the second substrate, or both.

48. The method of claim 40, wherein the pre-applied unpatterned spacers are within an alignment layer.

49. The method of claim 40, wherein the method further comprises adding partition walls to one or both substrates.

50. The method of claim 40, wherein the flexible cell is an optical device having a haze value less than 8%.

51. The method of claim 40, wherein the method is vacuum-less.

52. The method of claim 40, wherein the unpatterned spacers are spherical and 3-100 μm in size.

53. The method of claim 40, wherein the electro-optic material is selectively deposited in drops, lines or shapes on the first substrate.

54. The method of claim 40, wherein the electro-optic material is a guest-host dichroic dye-liquid crystal mixture.

55. The method of claim 40, wherein the flexible cell unit has an area greater than 30 cm$^2$.

56. The method of claim 40, wherein the flexible cell unit has a length greater than 10 cm.

* * * * *